G. Banister,
Corn Planter.
No. 91,595. Patented June 22, 1869.
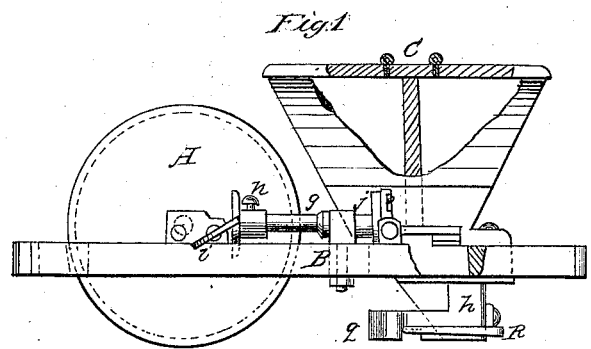
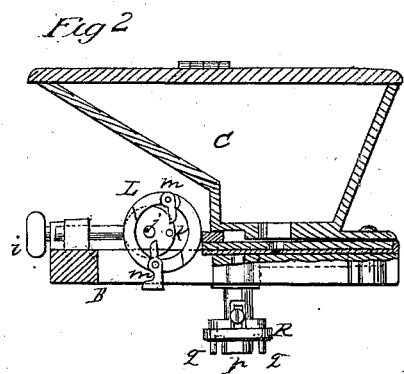
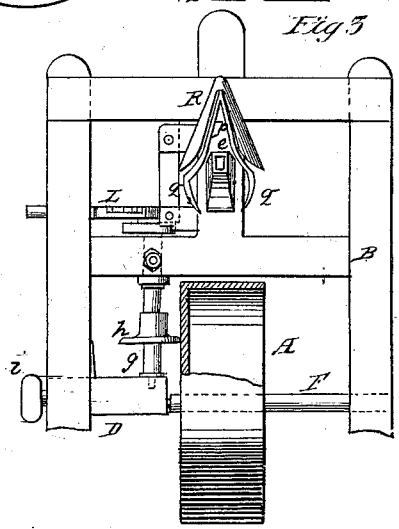
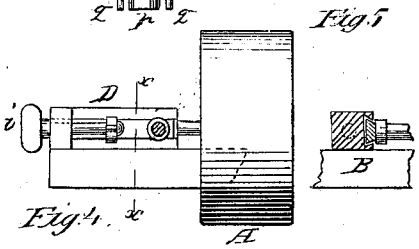
Witnesses
Jn. Becker
John F. Brock
Inventor
G. Banister
pr. Munn & Co
Attorneys.

United States Patent Office.

GEORGE BANISTER, OF HARTFORD, VERMONT.

Letters Patent No. 91,595, dated June 22, 1869.

---

IMPROVEMENT IN SEED-PLANTERS.

---

The Schedule referred to in these Letters Patent and making part of the same.

---

*To all whom it may concern:*

Be it known that I, GEORGE BANISTER, of Hartford, in the county of Windsor, and State of Vermont, have invented a new and useful Improvement in Seed-Planters; and I do hereby declare that the following is a full, clear, and exact description thereof, which will enable others skilled in the art to make and use the same, reference being had to the accompanying drawings, forming part of this specification.

This invention relates to a machine for planting corn and other seeds, with or without a fertilizer dropped therewith; and It consists in operating the machine by friction on a roller, or wheel, and in the method of operating the slide for discharging the seed, and in the plow, and the method of gauging the same and covering the seed, as will be hereinafter more fully described.

In the accompanying plate of drawings—

Figure 1 represents a side view of the planter, partly in section.

Figure 2 is a front-end view, also partly in section.

Figure 3 is a view of the bottom side of the machine, with parts broken away.

Figure 4 is a detailed view of the roller, showing the method of regulating the friction thereon.

Figure 5 is a section through the line $x\ x$ of fig. 4.

Similar letters of reference indicate corresponding parts.

A is the roller.

B is the frame upon which the roller is hung, and which supports the hopper and the operating-parts of the machine.

C is the hopper, provided with slides in its bottom, for delivering the seed and fertilizer therewith, both being delivered simultaneously through the same tube, directly in rear of the point of the plow, as seen at $e$, fig. 3.

D is a box, firmly attached to the frame which supports one end of the roller-shaft F, the other end being supported by the frame. (See fig. 3.)

This box contains a slide which supports one end of the shaft $g$, of the friction-wheel $h$. The position of the slide is governed by the thumb-screw $i$, so that the friction of the wheel $h$ on the roller A is increased or diminished, as may be desired.

On the end of this shaft $g$ there is a disk-wheel, $j$, in the face of which there is a projecting pin, as seen at $k$, fig. 2.

L is a ring, with shanks or guides on its sides, which is made to slide, or is given a horizontal reciprocating motion, by means of the loose dogs $m\ m$ attached to the ring.

The disk-wheel $k$ revolves just in the rear of the ring, so near it that the pin $k$ passes through it and engages with the dogs $m\ m$.

When the pin $k$ is carried in the proper direction for dropping seed, it engages with the dogs, and thereby moves the ring L.

The slides in the bottom of the hopper are connected with the inner guide or shank of this ring, and are operated and the seed delivered thereby.

When the machine moves backward, the pin raises the dogs, and does not act to move the slides.

When going to or from the field, the friction-wheel is disengaged from the roller, so that it does not revolve.

The speed with which the slides are operated is governed by the position of the friction-wheel $h$ on the side of the roller A.

This wheel is adjustable on its shaft $g$, and it is, of course, revolved faster or slower as it is moved towards or from the periphery of the roller. It is held in place by the set-screw $n$, and the friction is regulated by the thumb-screw $i$, as before stated.

In fig. 3, the plow is seen which makes the furrow or channel in which the seed is dropped.

$p$ is the plow, and $q$ represents wings connected with the plow, the back ends of which turn inward, and serve to cover the seed by scooping the earth towards the centre of the furrow.

R is a gauge which is adjustable by a set-screw on the standard of the plow. It conforms in shape to the plow, and regulates the depth of the furrow made by the plow.

In operating a seed-planter by means of a friction-wheel, it is evident that a much nicer adjustment of the slides may be made than when operated by cog-wheels, while, at the same time, accidents from breakage are much less likely to occur, and the expense of construction is materially less.

Having thus described my invention,

I claim as new, and desire to secure by Letters Patent—

1. The combination of the shaft $g$ and adjustable friction-wheel $h$ with the driving-wheel A, box D, and the adjustable slide within the box, substantially as described, for the purpose specified.

2. The disk-wheel $j$, with its pin $k$, sliding ring L, with its loose dogs $m\ m$, in combination with a seed-planter, arranged substantially as and for the purposes described.

3. The plow $p$, with its wings $q\ q$, and the gauge R, arranged substantially as described, in combination with a seed-planter, and for the purposes set forth.

GEORGE BANISTER.

Witnesses:
 J. W. FRENCH,
 EDWIN C. WATSON.